(12) United States Patent
Te Kolste et al.

(10) Patent No.: US 7,202,955 B2
(45) Date of Patent: Apr. 10, 2007

(54) SPECTRALLY DIVERSE SPECTROMETER AND ASSOCIATED METHODS

(75) Inventors: Robert D. Te Kolste, Charlotte, NC (US); Alan D. Kathman, Charlotte, NC (US)

(73) Assignee: Digital Optics Corporation, Charlotte, NC (US)

(*) Notice: Subject to any disclaimer, the term of this patent is extended or adjusted under 35 U.S.C. 154(b) by 189 days.

(21) Appl. No.: 10/879,519

(22) Filed: Jun. 30, 2004

(65) Prior Publication Data
US 2006/0001882 A1 Jan. 5, 2006

(51) Int. Cl.
*G01B 9/02* (2006.01)
(52) U.S. Cl. ...................................... 356/454
(58) Field of Classification Search .............. 356/454, 356/519, 419
See application file for complete search history.

(56) References Cited

U.S. PATENT DOCUMENTS 4,822,998 A * 4/1989 Yokota et al. .............. 356/419
5,726,805 A * 3/1998 Kaushik et al. ............. 359/589
6,016,199 A * 1/2000 Newton ...................... 356/454
6,359,693 B2 3/2002 Smith et al.

OTHER PUBLICATIONS

Carrano, et al., *Entitled, SPIE's oemagazine, pp. 20-22, (Apr. 2004).

* cited by examiner

*Primary Examiner*—Samuel A. Turner
(74) *Attorney, Agent, or Firm*—Lee & Morse, P.C.

(57) ABSTRACT

A spectrometer for use with a desired wavelength range includes an array of filters. Each filter outputs at least two non-contiguous wavelength peaks within the desired wavelength range. The array of filters is spectrally diverse over the desired wavelength range, and each filter in the array of filters outputs a spectrum of a first resolution. An array of detectors has a detector for receiving an output of a corresponding filter. A processor receives signals from each detector, and outputs a reconstructed spectrum having a second resolution, the second resolution being higher than any of the first resolution of each filter.

22 Claims, 8 Drawing Sheets

2-d SUBWAVELENGTH Si ON SILICA FILTER PERFORMANCE THICKNESS, 0.6 MICRON PERIOD

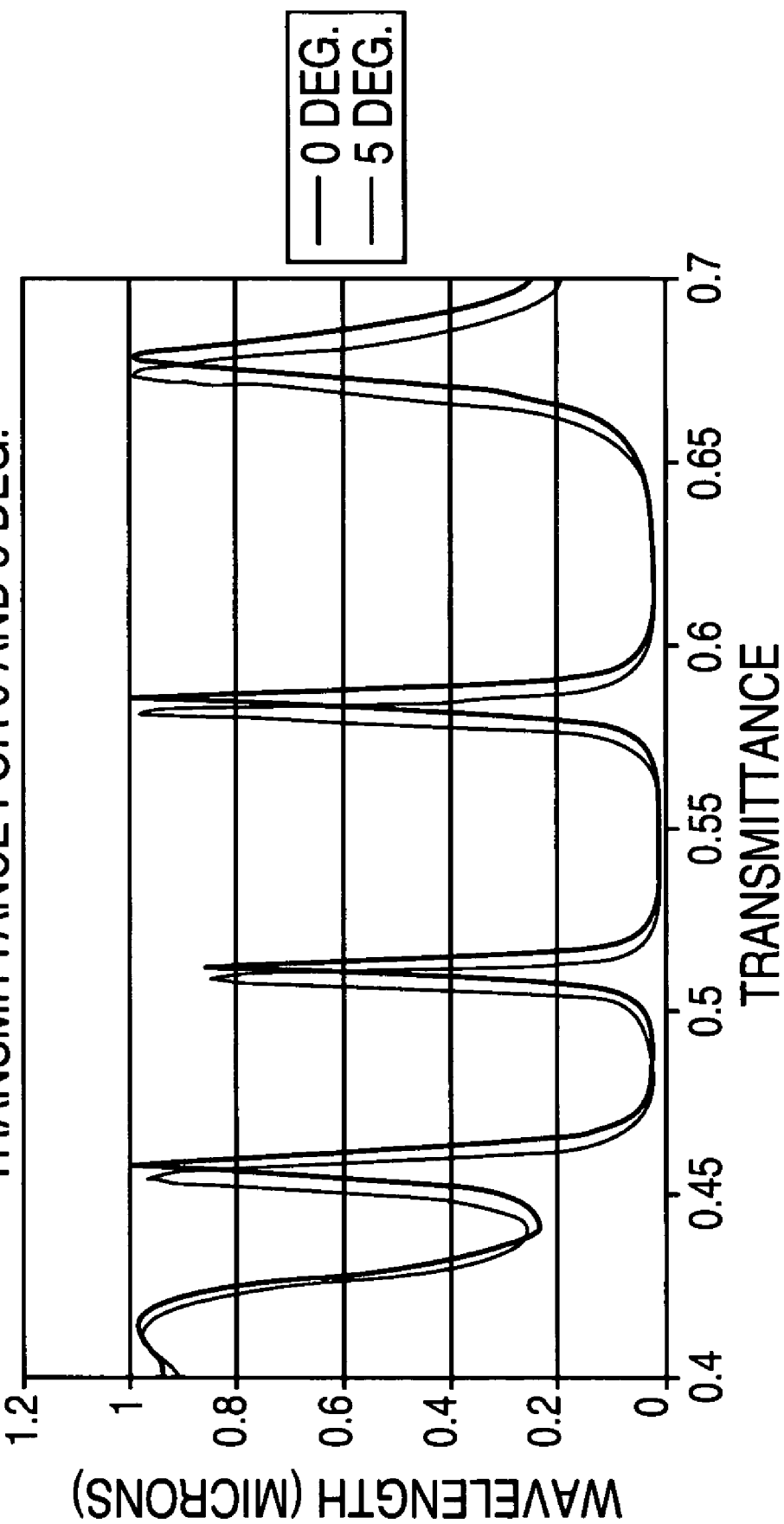

SPECTRALLY DIVERSE SPECTROMETER AND ASSOCIATED METHODS

BACKGROUND OF THE INVENTION

1. Field of the Invention

The present invention is directed to a spectrally diverse spectrometer and associated methods. More particularly, the present invention is directed to a spectrally diverse spectrometer having an array of wavelength differentiating elements which are not designed for a specific wavelength.

2. Description of Related Art

Conventional spectrometers typically use gratings or thin film filters to discriminate between wavelengths. Gratings are expensive and generally throw away a lot of light due to the modal filtering performed by the gratings. Thin film filters need to be provided in an array for each spectrometer and require multiple coating passes, also increasing cost.

Further, both of these solutions are designed to provide a particular band pass, e.g., a notch filter which only allows a very narrow wavelength range through. An example of such a filter spectrum is shown in FIG. 1. This is not a very efficient use of the light in these systems.

Much of the development in spectrometers has been directed to providing higher resolution systems, which, while increasing accuracy, serves to exacerbate the waste of light. Further, these systems tend to be very sensitive to incident angle. Finally, as wavelength resolution increases, the sensitivity to noise also increases. For many uses, this is acceptable. However, there are many situations using a spectrometer that cannot afford throwing away light and need to be angularly robust.

SUMMARY OF THE INVENTION

The present invention is therefore directed to a spectrometer and associated methods that substantially overcome one or more of the problems due to the limitations and disadvantages of the related art.

It is a feature of the present invention to provide a spectrometer that exploits much of the input light. It is another feature of the present invention to provide a spectrometer that includes a plurality of individual filters, each of which do not have a narrow band pass. It is yet another feature of the present invention to provide a spectrometer which is relatively insensitive to angle.

At least one of the above and other features and advantages may be realized by providing a spectrometer for use with a desired wavelength range including an array of filters, each filter outputting at least two non-contiguous wavelength peaks within the desired wavelength range, the array of filters being spectrally diverse over the desired wavelength range, wherein each filter in the array of filters outputs a spectrum of a first resolution, an array of detectors, each detector receiving an output of a corresponding filter, and a processor receiving signals from each detector, the processor outputting a reconstructed spectrum having a second resolution, the second resolution being higher than any of the first resolution of each filter.

Each filter may include a substrate and a pattern on the substrate, the pattern being in a material having a higher refractive index than that of the substrate. The pattern may have features on the order of or smaller than a wavelength of the desired wavelength range. The pattern varies in at least one of depth and period across the array of filters. Input light may be transmitted through the substrate and the pattern or may be reflected from the pattern. A period of the pattern across the array of filters may be on the order of or smaller than a wavelength of the desired wavelength range.

Each filter may include an etalon. The etalons in the array of filters may have varying cavity lengths. The cavity length may be on an order of magnitude of a wavelength in the desired wavelength range. The etalon may be an air gap etalon or a solid etalon. The varying cavity length may be realized by providing steps of varying height for each etalon.

The processor may output a reconstructed spectrum of input light by applying the inverse filter function to the signals output by the detectors. The outputs of the array of filters may be substantially constant with respect to an angle of light incident thereon. The array of filters may be provided directly on the array of detectors. Any two filters in the array of filters may have transmittance vectors that are linearly independent of one another and are not orthogonal. Multiple filters of the array of filters may pass overlapping wavelength ranges. Each detector includes a plurality of sensing portions. The array of filters may be continuous.

At least one of the above and other features and advantages of the present invention may be realized by providing a method of making a spectrometer for use with a desired wavelength range, including forming an array of filters, each filter outputting at least two non-contiguous wavelength peaks within the desired wavelength range, the array of filters being spectrally diverse over the desired wavelength range, wherein each filter in the array of filters is varied across the array, and providing an array of detectors, each detector receiving an output of a corresponding filter.

BRIEF DESCRIPTION OF THE DRAWINGS

The above and other features and advantages of the present invention will become readily apparent to those of skill in the art by describing in detail embodiments thereof with reference to the attached drawings, in which:

FIG. 12 is a plot of the transmittance versus wavelength of a spectrometer of FIG. 10 with varying input angles.

DETAILED DESCRIPTION OF THE INVENTION

Figure 1:
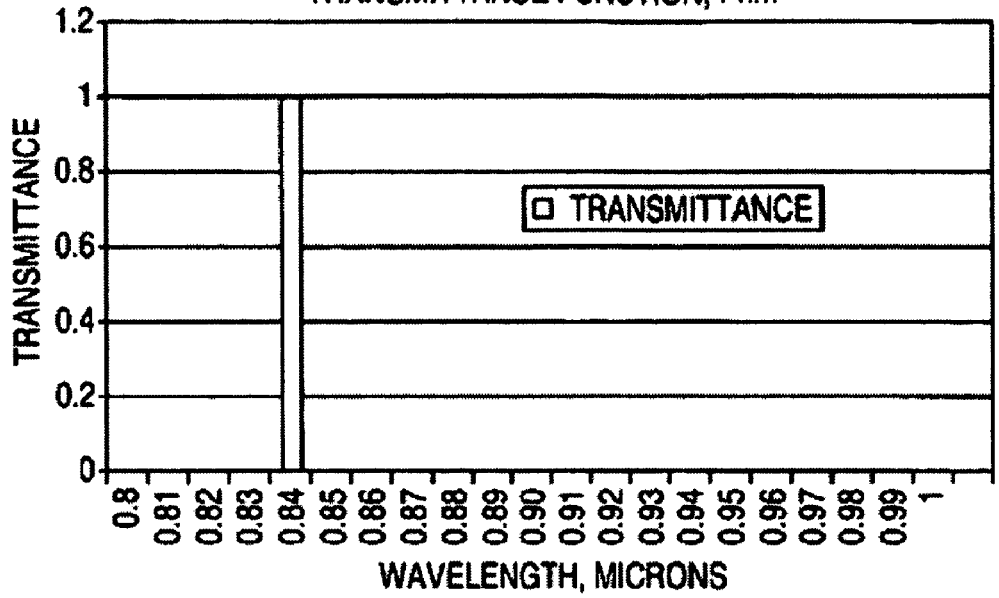
FIG. 1 is a plot of transmittance versus wavelength for a conventional notch filter.

FIG. 1 is a plot of transmittance versus wavelength for a conventional notch filter. As can be seen therein, the conventional notch filter only allows a very narrow bandwidth of light through, to allow accurate determination of wavelength of light being measured. Numerous such filters may be provided to monitor a spectrum of interest.

Figure 2:
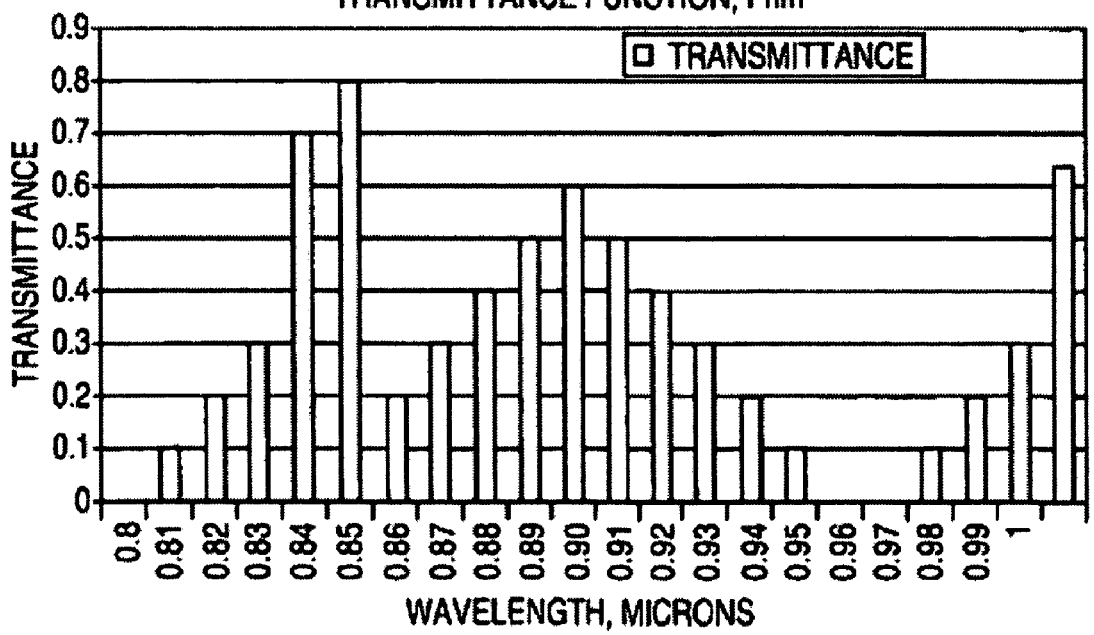
FIG. 2 is a plot of transmittance versus wavelength for a filter in accordance with the present invention.

In contrast to the conventional notch filter, a filter according to the present invention, as shown in FIG. 2, passes numerous wavelengths at various transmittance levels. By providing an array of these filters, a spectrally diverse transmittance spectrum can be realized. Thus, rather than providing an array of filters each responsive to a specific wavelength to cover a desired wavelength range, an array of filters that cumulatively provide the needed spectral diversity such that wavelengths of input light may be discerned with acceptable accuracy is used in accordance with the present invention. By determining the characteristics of each filter in the array and using available information provided from each filter, a high resolution spectrum may be extracted from a plurality of low resolution spectra.

The response of the spectrometer may be generally represented as:

$$I_n = \int F_n(\lambda) S(\lambda) d\lambda \quad (1)$$

where I is the intensity of light output from the spectrometer, F is the individual filter response for each of n filters and S is the input spectrum. In discretized form:

$$I_n = \sum_{m=1}^{N} F_n(\lambda_m) S(\lambda_m) \Delta\lambda = F_{mn} S_m \quad (2)$$

Thus, knowing the filter response and the output of the spectrometer, the input spectrum may be represented as:

$$S_m = F_{nm}^{-1} I_n \quad (3)$$

While the number of such filters required to achieve a sufficient level of resolution will be greater than the number of bandpass filters for comparable resolution, a spectrometer using such filters may have a higher light efficiency and may be more angularly robust.

Figure 3:
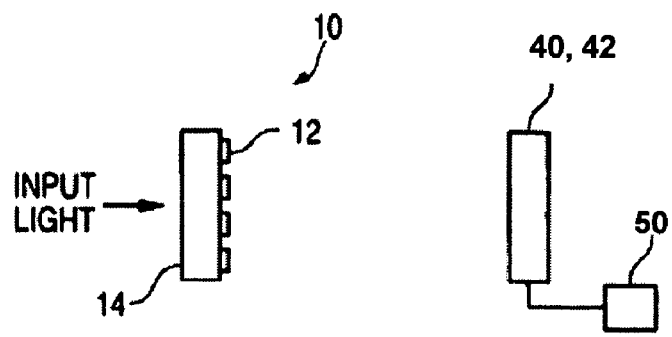
FIG. 3 is schematic side view of a filter in accordance with a first embodiment of the present invention.

A first embodiment of the present invention realizes a spectrally diverse output by creating a highly dispersive structure 10, shown in FIG. 3. The structure 10 includes a patterned high index material 12, i.e., having a refractive index higher than that of the substrate, on a substrate 14. An array of these structures 10 are used in a first embodiment of a spectrometer of the present invention. Light transmitted by the array of structures 10 is detected by a detector array 40. The outputs of detectors 42 in the detector array 40 are provided to a processing system 50, which can then determine the input spectrum in accordance with Equation (3). Various conventional elements may be provided as required, such as lenses for directing the light onto the array of structures 10 and relaying the light between the array of structures 10 and the detector array 40. The structure 10 may also be used in a reflective mode, with the detector array 40 positioned accordingly. The array of structures 10 may be secured directly to the detector array 40.

The substrate 14 may be fused silica or Pyrex. The high index material may be silicon or titanium dioxide. The high index material should be patternable, have an index of refraction higher than that of the substrate and be at least sufficiently transmissive at the wavelengths of interest. The relative indices between the substrate and the material having the pattern aid in the creation of a spectrally diverse output. The pattern may have sub-wavelength or near wavelength features, i.e., on the order of the wavelength of light of interest or smaller. The pattern may result in the substrate being exposed, may leave some of the high index material on the substrate even where an indent is present or there may be another layer of material between the high index material and the substrate.

Figure 4:
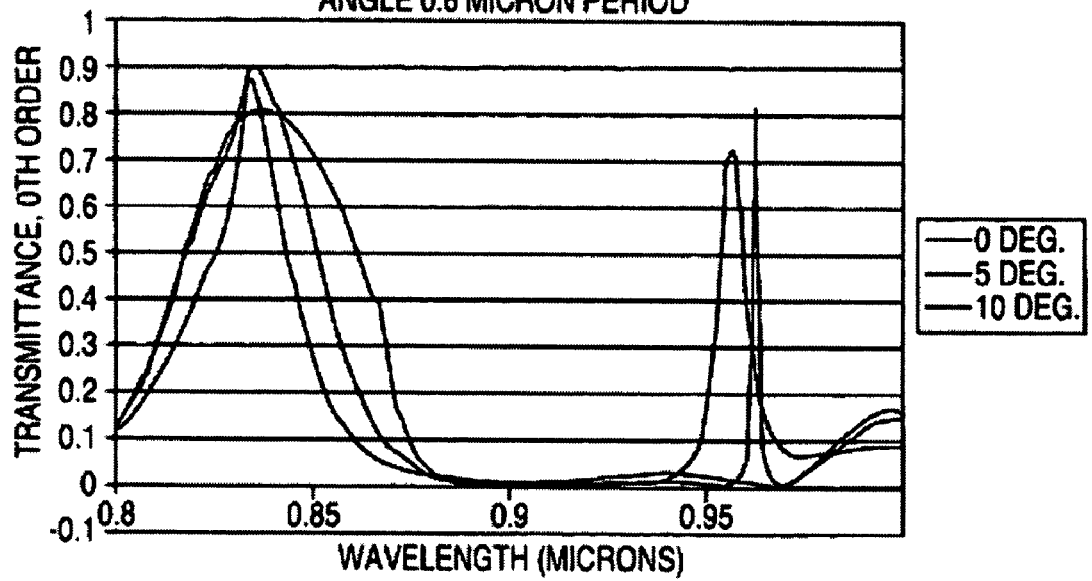
FIG. 4 is a plot of the wavelength versus transmittance of a filter in accordance with an embodiment of the present invention with varying input angles.

An example of such a structure to be used in the visible to near infrared range includes a fused silica substrate with patterned silicon having a period of 0.6 microns and a thickness or depth of 0.65 microns. A plot of transmittance of zero-order light versus wavelength for this example is shown in FIG. 4. This plot also illustrates that the performance of this structure is relatively insensitive to changes in incident angle, i.e., good discrimination performance is maintained as the angle changes.

Figure 5:
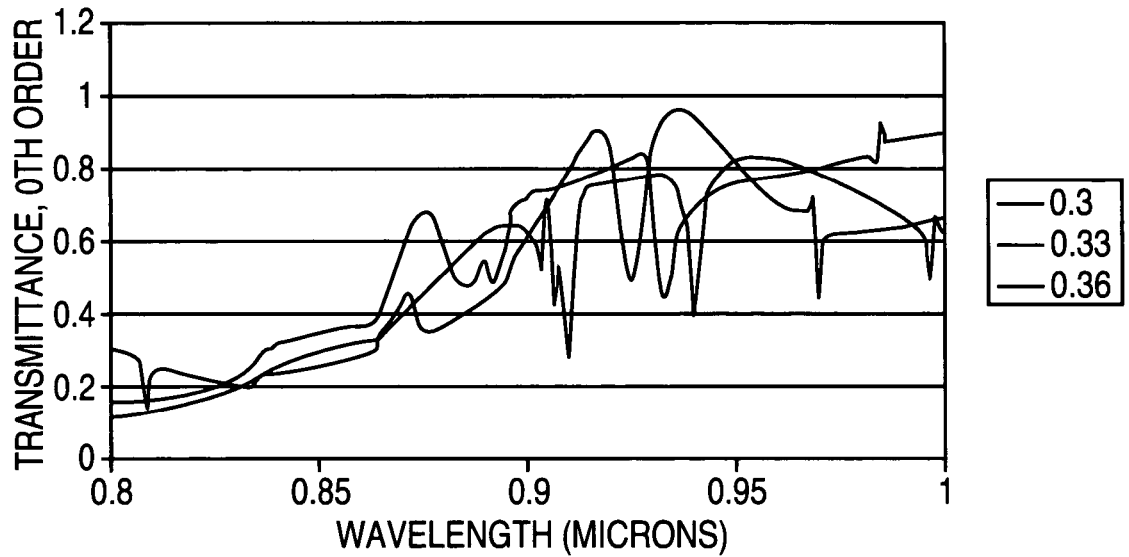
FIG. 5 is an plot of wavelength versus transmittance for a spectrometer in accordance with an embodiment of the present invention.

Another example of such a spectrometer for use in the visible to near infrared region has gratings in silicon on silica having the same period, here 0.6 microns, with varying sub-wavelength depths in the silicon, e.g., 0.3, 0.33 and 0.36 microns. A plot of transmittance of zero-order light versus wavelength for this example is shown in FIG. 5. As can be seen in FIG. 5, the spectra vary dramatically with a change in the etch depth. While there is no clear bandpass, as long as there is sufficient spectral diversity such that different wavelengths will have different transmittance over a desired bandwidth, this is sufficient.

Figure 6:
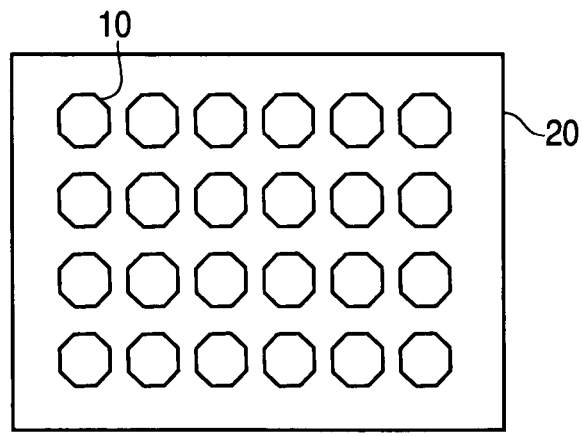
FIG. 6 is a schematic top view of an array of filters according to the first embodiment of the present invention.

A plurality of these structures 10 may be provided in an array 20 as shown in FIG. 6. Variations in the transmission spectra across the array 20 may be realized by varying the period and/or the thickness of the features of the pattern. By varying the pattern, different transmission spectra can be realized for high spectral diversity. The actual pattern used may be iteratively computed by altering one or both of the period and the depth until sufficient spectral diversity with adequate resolution is provided across a desired wavelength range. In an idealized structure, the resolution would be equal to the wavelength range or band of interest divided by the number of filters. However, in practice, there will be some overlap in the wavelength regions covered by the filters for redundancy and to reduce the signal-to-noise ratio. The period may be between the wavelength in the high index material and the wavelength in the low index material.

To achieve a sufficiently spectrally diverse output, the period and/or depth of the pattern may be iteratively altered until the desired output is obtained. The filter may also be used in a reflective mode in which the input light is incident on the structure at an angle, e.g., 45°. This may result in improved contrast, since the difference in refractive index between the high index pattern and the ambient environment is typically greater than that between the high index pattern and the substrate.

Figure 7:
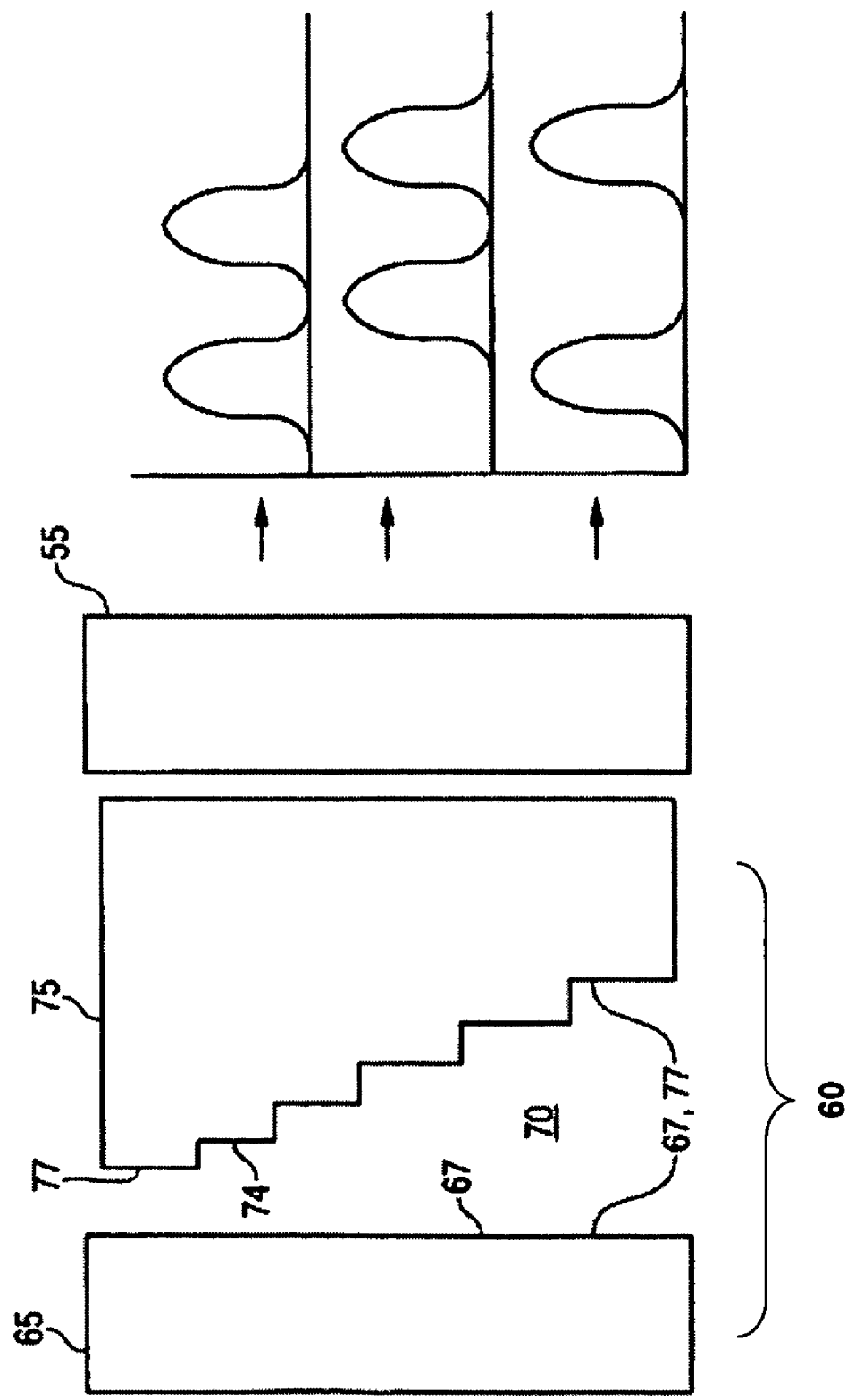
FIG. 7 is a schematic side view of a spectrometer according to a second embodiment of the present invention, along with representative exemplary outputs.

In another configuration of the present invention, spectrally diverse transmission may be realized using etalons 60 to create the filters, an example of which is shown in FIG. 7. Etalon signals behave similarly to Fourier spectra, so a more deterministic approach may be used in creating an array of etalons, rather than the iterative approach above. For example, the function F of each etalon may be given as:

$$F(\lambda) = F'\left(\frac{2\pi x}{\Delta \lambda}\right) \quad (4)$$

where $x=\lambda-\lambda_0$, $\lambda_0$ is a middle wavelength in the range of interest, $\Delta\lambda=\lambda_{max}-\lambda_{min}$, where $\lambda_{max}$ is the maximum wavelength in the range and $\lambda_{min}$ is the minimum wavelength in the range, and F' is defined between $-\pi$ to $\pi$. If this is then approximated as a Fourier series assuming the output is a true sinusoid, then:

$$F'\left(\frac{2\pi x}{\Delta \lambda}\right) = \frac{a_0}{2} + a_1 \cos\left(\frac{2\pi x}{\Delta \lambda}\right) + b_1 \sin\left(\frac{2\pi x}{\Delta \lambda}\right) + \ldots + a_n \cos\left(\frac{2n\pi x}{\Delta \lambda}\right) + b_n \sin\left(\frac{2n\pi x}{\Delta \lambda}\right) \quad (5)$$

The number n selected will determine the number of etalon/detector pairs needed, i.e., 2n, so that there is an etalon for each sine and cosine. Etalons having behavior that may not be so approximated with sufficient accuracy may still be used in accordance with the present invention, although the mathematical model required will be more complicated. While this model may be useful in beginning a design of the etalons, the more general approach outlined above in equations (1) to (3) is used to obtain the reconstructed spectra.

Each etalon has multiple resonance peaks, as can be seen with the three representative outputs as shown in FIG. 7. These peaks occur at different wavelengths due to the different cavity lengths of the different etalons. Since the etalons will operate over a range of incident angles, the reflectance on the opposing surfaces thereof will be selected to provide the best combination of signal reconstruction, robustness to noise and light throughput. Resolution of the spectrometer using etalons may be improved by increasing the finesse or the cavity length of the etalons. The range of cavity lengths to be used corresponds roughly with wavelength. If the cavity length is too large, the respective etalon peaks will be too close together, and will be more sensitive to incident angle. Further, for shorter cavity lengths, a larger cone angle can be accepted, increasing light efficiency. However, if the cavity lengths are too short, the resolving power is decreased and contrast is limited.

For operation in the visible region, these etalons may have cavity lengths of less than 10 microns. If the cavity lengths are too long, e.g., roughly greater than 100 microns, the etalon becomes highly angularly sensitive and the spectrometer constructed there from has a low light efficiency. If the cavity lengths are too short, e.g., roughly 1 micron or less, there is lower resolving power and limited contrast.

The etalons 60 forming the filters of a second embodiment are shown in FIG. 7 include two substrates 65 and 75 defining a cavity 70 therebetween. Each substrate has a reflective coating 67, 77, respectively, thereon. One of the substrates 75 has steps therein for altering the depth of the cavity 70 across the array. The depth of the cavity 70 along with the reflective coatings 66, 77 defines each etalon 60.

Figure 8:
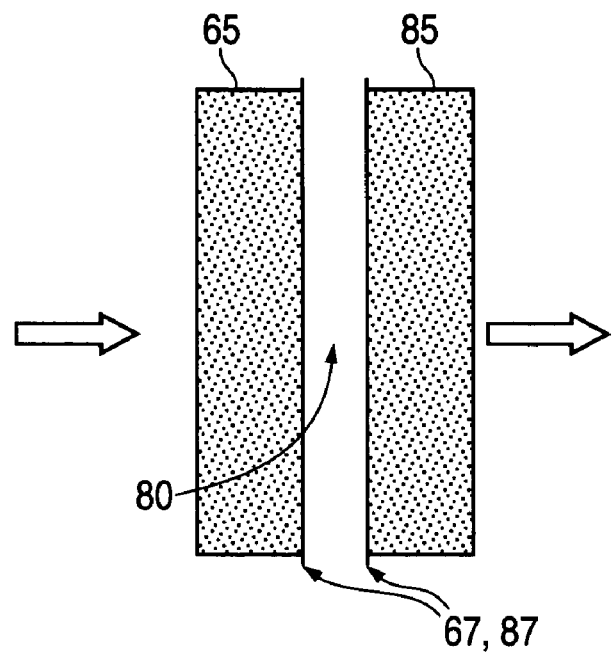
FIG. 8 is a schematic side view of a filter according to a third embodiment of the present invention.

Alternatively, as shown in FIG. 8, the filters of a third embodiment have each etalon may include two planar substrates 65, 85, defining a cavity 80 therebetween. The cavity length is varied across the array to create different etalons 60.

Figure 9:
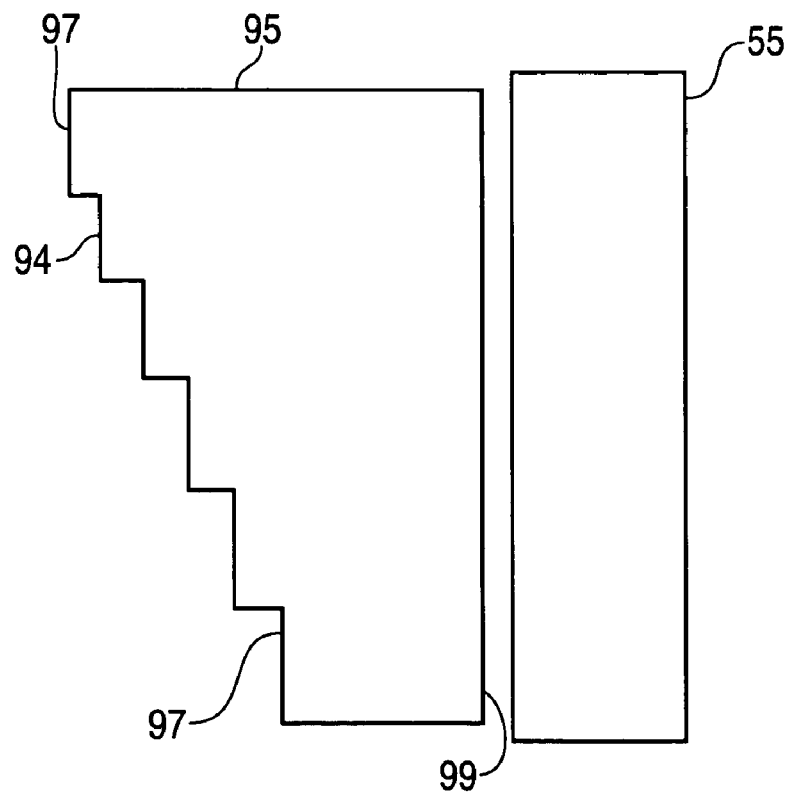
FIG. 9 is a schematic side view of a filter according to a fourth embodiment of the present invention.

A further alternative etalon forming the filters of a fourth embodiment is shown in FIG. 9. Here, a single stepped substrate 95 is used. There are reflective coatings 97, 99 on either side of the substrate 95 and the cavity 90 is internal to the substrate 95. The substrate 95 may be a high index material, but also needs to be transparent to the wavelengths of interest.

Again, a spectrometer using the etalon array includes a corresponding detector array 55 and a processor 50. The etalons are located between the input light and the detectors. The etalons may be at an intermediate image plane or right against the detector array.

Figure 10:
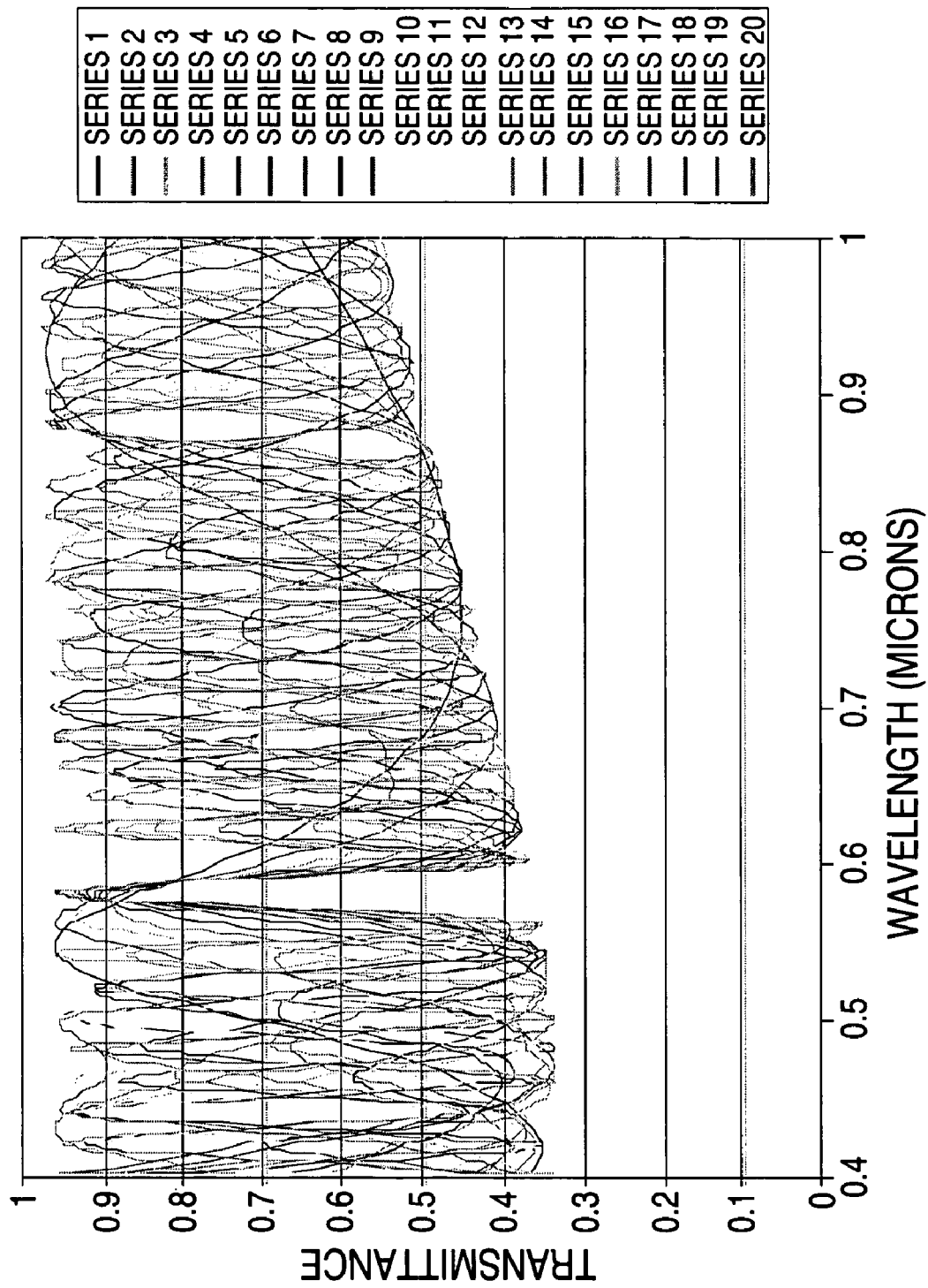
FIG. 10 is a plot of transmittance versus wavelength for a spectrometer having filters according to the second embodiment of the present invention, with twenty steps.

An example of spectra output from an array of twenty etalons 60 configured as the stepped air gap etalon of FIG. 7, having cavity depth between 0.2 and 4 microns and peak reflectances between 60–80%, is shown in FIG. 10. As can be seen therein, there is spectral diversity across the entire visible range, extending from the ultraviolet to the near infrared.

Figure 11:
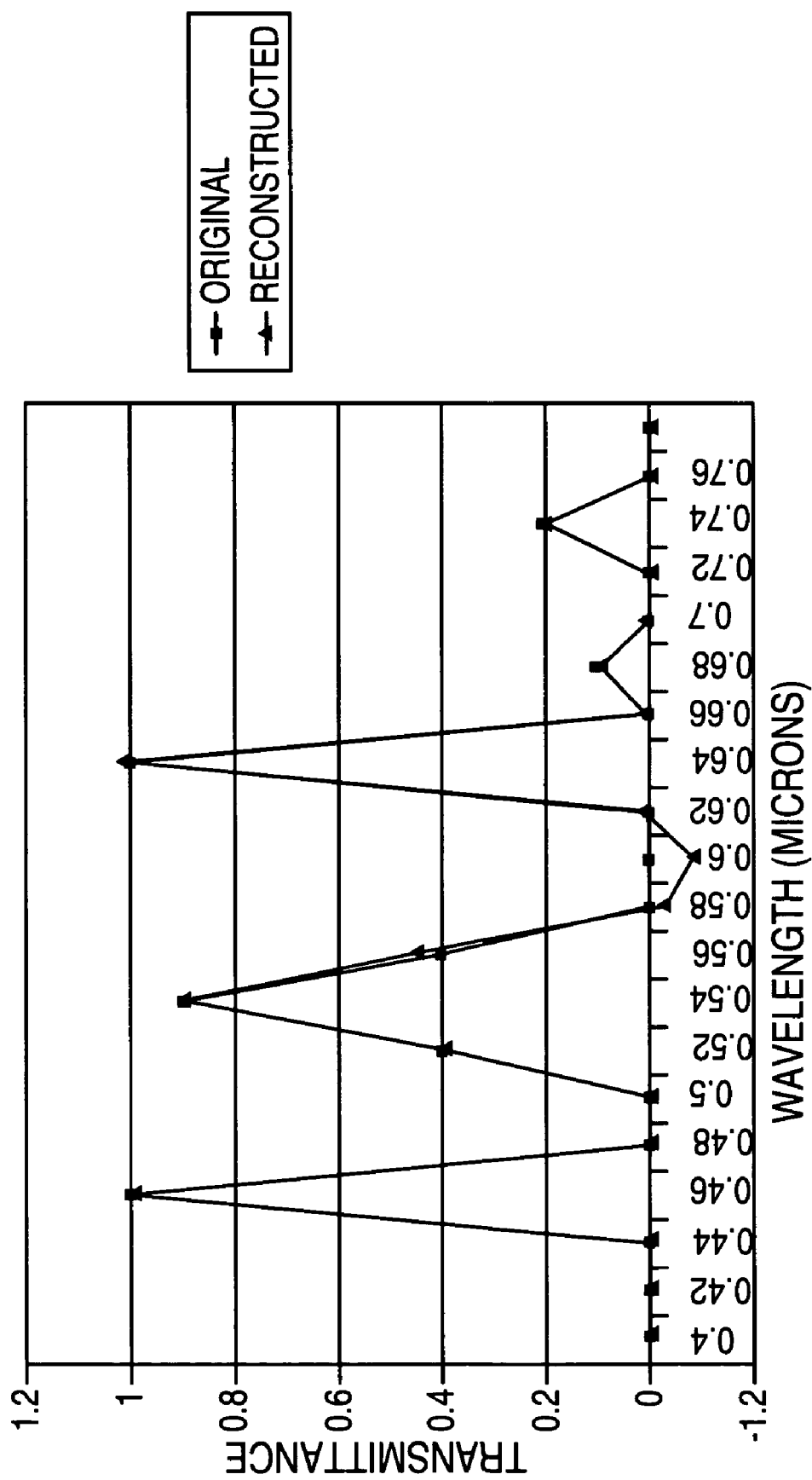
FIG. 11 is a plot of the original spectra input to the spectrometer and the reconstructed spectra from FIG. 10.

The input spectrum used to generate these spectra is shown in FIG. 11 as the square plot. The inverse filter function for each of these spectra was then applied to the spectra of FIG. 10 to generate the reconstructed spectra of FIG. 11, shown as the triangle plot. The lighter plot of the reconstructed spectra overlays the darker plot of the original spectra. As can be seen therein, the reconstructed spectrum is very accurate, although the region right around 0.6 microns was difficult to resolve accurately, as would be expected from the spectra in FIG. 10.

FIG. 12 is a plot of transmittance versus wavelength for different illumination angles of the spectrometer providing the spectra of FIGS. 10 and 11. As can be seen therein, alteration in illumination angle just shifts the spectra, without radically altering the nature thereof.

Since the filters of the spectrometer of the present invention are to be varied and are for providing spectral diversity rather than a specific response, the inherent variation arising from the manufacture of the filters may provide a more robust spectrometer. Particularly when these filters are made at the wafer level, variation across the wafer may actually help in increasing the spectral diversity. This allows the manufacturing tolerances to be eased.

While the above embodiments illustrate a detector element associated with a filter, the detector element may include more than one sensing region. Thus, light output from a single filter may be incident on more than one sensing region, and then an average signal from all these sensing regions may be output to the processor. This helps to reduce noise in the system.

Additionally, while the filters discussed above were assumed to be discrete filters in an array of filters, these filters may be continuous and the array becomes an arbitrary one of convenience of illustration. For example, instead of the stepped etalon of FIG. 7, a wedged etalon may be used.

Thus, by characterizing the filter function for each filter in an array of filters and then providing the inverse of these filter functions to the output of a corresponding detector array, an input spectrum may be reconstructed. According to the present invention, a spectrally diverse function may be created across an array of filters, either iteratively or deterministically. While no individual filter can discriminate a particular wavelength, the cumulative effect across the filters allows input light to be characterized across a desired wavelength range with a needed resolution. Properly designed, taking into account remaining filters of the array, the increase in the number of filters will increase the resolution. The transmittance vector of any two filters may be linearly independent and not orthogonal.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

What is claimed is:

1. A spectrometer for use with a desired wavelength range, comprising:
   an array of filters, each filter outputting at least two non-contiguous wavelength peaks within the desired wavelength range, the array of filters being spectrally diverse over the desired wavelength range, wherein each filter in the array of filters outputs a spectrum of a first resolution;
   an array of detectors, each detector receiving an output of a corresponding filter; and
   a processor receiving signals from each detector, the processor outputting a reconstructed spectrum having a second resolution, the second resolution being higher than any of the first resolution of each filter.

2. The spectrometer as claimed in claim 1, wherein each filter comprises:
   a substrate; and
   a pattern on the substrate, the pattern being in a material having a higher refractive index than that of the substrate.

3. The spectrometer as claimed in claim 2, wherein the pattern has features on the order of or smaller than a wavelength of the desired wavelength range.

4. The spectrometer as claimed in claim 2, wherein the pattern varies in at least one of depth and period across the array of filters.

5. The spectrometer as claimed in claim 2, wherein input light is transmitted through the substrate and the pattern.

6. The spectrometer as claimed in claim 2, wherein input light is reflected from the pattern.

7. The spectrometer as claimed in claim 2, wherein a period of the pattern across the array of filters is on the order of or smaller than a wavelength of the desired wavelength range.

8. The spectrometer as claimed in claim 1, wherein each filter includes an etalon.

9. The spectrometer as claimed in claim 8, wherein etalons in the array of filters have varying cavity lengths.

10. The spectrometer as claimed in claim 9, wherein the varying cavity length is realized by providing steps of varying height for each etalon.

11. The spectrometer as claimed in claim 9, wherein the etalon is an air gap etalon and the varying cavity length is realized by providing air gaps of varying height for each etalon.

12. The spectrometer as claimed in claim 8, wherein the etalon has a cavity length on an order of magnitude of a wavelength in the desired wavelength range.

13. The spectrometer as claimed in claim 8, wherein the etalon is an air gap etalon.

14. The spectrometer as claimed in claim 8, wherein the etalon is a solid etalon.

15. The spectrometer as claimed in claim 1, wherein the processor outputs a reconstructed spectrum of input light by applying the inverse filter function to the signals output by the detectors.

16. The spectrometer as claimed in claim 1, wherein outputs of the array of filters are substantially constant with respect to an angle of light incident thereon.

17. The spectrometer as claimed in claim 1, wherein the array of filters is provided directly on the array of detectors.

18. The spectrometer as claimed in claim 1, wherein any two filters in the array of filters have transmittance vectors that are linearly independent of one another and are not orthogonal.

19. The spectrometer as claimed in claim 1, wherein multiple filters of the array of filters pass overlapping wavelength ranges.

20. The spectrometer as claimed in claim 1, wherein each detector includes a plurality of sensing portions.

21. The spectrometer as claimed in claim 1, wherein the array of filters is continuous.

22. A method of making a spectrometer for determining a wavelength of an input light signal within a desired wavelength range, comprising:
   forming an array of filters, each filter outputting at least two non-contiguous wavelength peaks within the desired wavelength range, the array of filters being spectrally diverse over the desired wavelength range, wherein each filter in the array of filters outputs a spectrum of a first resolution and is varied across the array; and
   providing an array of detectors, each detector receiving an output of a corresponding filter, wherein the wavelength of the input light signal is determined with a second resolution the second resolution being higher than the first resolution.

* * * * *